United States Patent
Wang

(10) Patent No.: US 10,339,899 B2
(45) Date of Patent: Jul. 2, 2019

(54) CHARACTER STRING DISPLAY METHOD AND APPARATUS

(71) Applicant: TENCENT TECHNOLOGY (SHENZHEN) COMPANY LIMITED, Shenzhen (CN)

(72) Inventor: Yulong Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 177 days.

(21) Appl. No.: 15/278,906

(22) Filed: Sep. 28, 2016

(65) Prior Publication Data

US 2017/0018259 A1   Jan. 19, 2017

Related U.S. Application Data

(63) Continuation of application No. PCT/CN2015/076694, filed on Apr. 16, 2015.

(30) Foreign Application Priority Data

Apr. 18, 2014  (CN) .......................... 2014 1 0156429

(51) Int. Cl.
G09G 5/24      (2006.01)
G06F 17/21     (2006.01)
G06T 13/80     (2011.01)

(52) U.S. Cl.
CPC ............. *G09G 5/24* (2013.01); *G06F 17/214* (2013.01); *G06T 13/80* (2013.01)

(58) Field of Classification Search
None
See application file for complete search history.

(56) References Cited

U.S. PATENT DOCUMENTS 3,279,098 A * 10/1966 Taylor ................... G09B 5/067
                                                      434/167
2002/0093683 A1   7/2002 Focazio et al.
(Continued)

FOREIGN PATENT DOCUMENTS

CN   101291476 A   10/2008
CN   101820522 A   9/2010
(Continued)

OTHER PUBLICATIONS

Yildirim, "After Effects Template : Airport Departure Board", https://www.youtube.com/watch?v=mVRUStS_gdY, Jan. 31, 2014.*
(Continued)

*Primary Examiner* — Jeffrey J Chow
(74) *Attorney, Agent, or Firm* — Anova Law Group, PLLC

(57) ABSTRACT

A character string display method includes: acquiring character string data, the character string data being data corresponding to a to-be-displayed character string, and the character string including at least one character; analyzing the character string data to generate an analysis result, the analysis result including number of digit information related to the character string and digit sequence information of each character; and displaying, digit by digit according to the digit sequence information and the number of digit information, a picture set corresponding to each character, the picture set including at least one picture.

17 Claims, 7 Drawing Sheets

(56) References Cited

U.S. PATENT DOCUMENTS

2008/0222518 A1  9/2008  Walker
2013/0347090 A1  12/2013  Foote

FOREIGN PATENT DOCUMENTS

| CN | 103065341 A | 4/2013 |
| TW | 511007 B | 11/2002 |
| TW | 586083 B | 5/2004 |

OTHER PUBLICATIONS

The State Intellectual Property Office of the People's Republic of China (SIPO) Office Action 1 for 201410156429.X dated Mar. 2, 2018 8 Pages (including translation).
Taiwan Intellectual Property Office (TIPO) Office Action 1 for 104112141 dated Nov. 10, 2015 pp. 1-5.
The World Intellectual Property Organization (WIPO) International Search Report for PCT/CN2015/076694 dated Jun. 26, 2015 pp. 1-3.

* cited by examiner

CHARACTER STRING DISPLAY METHOD AND APPARATUS

CROSS-REFERENCES TO RELATED APPLICATIONS

This application is a continuation of PCT Application No. PCT/CN2015/076694 filed on Apr. 16, 2015, which claims priority of Chinese Patent Application No. 201410156429X, filed on Apr. 18, 2014. The entire contents of the two applications are incorporated by reference herein.

FIELD OF THE TECHNOLOGY

The present disclosure relates to the field of computer technologies, and in particular, to a character string display method and apparatus.

BACKGROUND OF THE DISCLOSURE

Some character strings are generally required to be displayed in conventional Internet applications or computer programs, so as to indicate specific meanings. For example, in a game, information, such as a score, a step number, and a time, is indicated by numerals.

A conventional character string display solution generally is displaying a to-be-displayed character string on a display area statically.

SUMMARY

Embodiments of the present invention provide a character string display method and apparatus, which can display a character string dynamically.

A character string display method includes: at a computing device having one or more processors and memory storing programs executed by the one or more processors: acquiring character string data, the character string data being data corresponding to a to-be-displayed character string, and the character string including at least one character; analyzing the character string data to generate an analysis result, the analysis result including number of digit information related to the character string and digit sequence information of each character; and displaying, digit by digit according to the digit sequence information and the number of digit information, a picture set corresponding to each character, the picture set including at least one picture.

A character string display apparatus is provided, including: one or more processors; memory; and one or more program modules stored in the memory and executed by the one or more processors, the one or more program modules including: an acquiring module, configured to acquire character string data, the character string data being data corresponding to a to-be-displayed character string, and the character string including at least one character; an analyzing module, configured to analyze the character string data to generate an analysis result, the analysis result including number of digit information related to the character string and digit sequence information of each character; and a display module, configured to display, digit by digit according to the digit sequence information and the number of digit information, a picture set corresponding to each character, the picture set including at least one picture.

A non-transitory computer readable storage medium having stored therein one or more instructions, which, when executed by a computing device, cause the computing device to: acquire character string data, the character string data being data corresponding to a to-be-displayed character string, and the character string comprising at least one character; analyze the character string data to acquire number of digit information related to the character string and digit sequence information of each character; and display, digit by digit according to the digit sequence information and the number of digit information, a picture set corresponding to each character, the picture set comprising at least one picture.

According to the character string display apparatus and method in the present disclosure, a character string can be dynamically displayed, thereby overcoming the defect that using a Flash animation cannot meet the requirement of dynamic change of characters, and also overcoming the defect that upper and lower limits of numerals cannot be restricted.

In order to make the above content of the present disclosure more comprehensible, detailed description is provided below by using preferred embodiments with reference to the accompanying drawings.

BRIEF DESCRIPTION OF THE DRAWINGS

The aforementioned features and advantages of the disclosed embodiments as well as additional features and advantages thereof will be more clearly understood hereinafter as a result of a detailed description of preferred embodiments when taken in conjunction with the drawings.

The following briefly describes the accompanying drawings included for describing the embodiments or the prior art. The accompanying drawings in the following descriptions merely show some embodiments, and a person of ordinary skill in the art can derive other drawings from these accompanying drawings without creative efforts.

DESCRIPTION OF EMBODIMENTS

Figure 1:
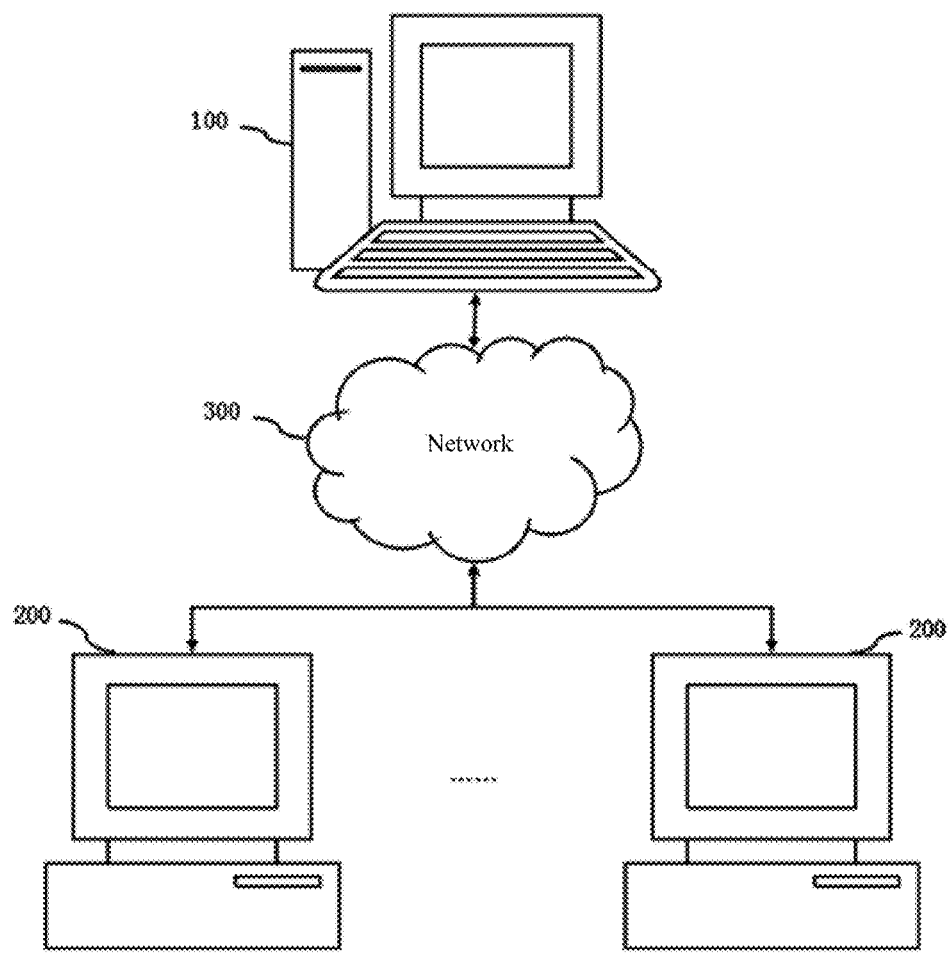
FIG. 1 is a schematic diagram of a working mode of a character string display method and apparatus according to the present disclosure.

Descriptions of the following embodiments are provided with reference to the accompanying drawings, so as to exemplarily describe the specific embodiments of the present invention that can be implemented.

The term "character" includes a letter, a numeral, a word, a symbol, and the like.

The term "character string" refers to a limited string of at least one of the above characters arranged according to a certain order.

The term "number of digit information" refers to the number of characters in the character string.

The term "digit sequence information" refers to a position at which each character in the character string is located, such as an ones place, a hundreds place, or a thousand place.

The term "character value" refers to a value corresponding to the character in the character string. For example, in a decimal character string, a value of a character "1" is 1, and a value of a character "5" is 5; and in a hexadecimal character string, a value of a character "A" is 10, and a value of a character "F" is 15, and the like.

The term "system information" refers to a system corresponding to the character string, such as a decimal system, a hexadecimal system, a base-26 numeral system, or an octal system.

The term "display process value" refers to a stage of a display process, for example, if 10 pictures are required to be displayed, and 5 pictures have been displayed currently, the display process value corresponds to the values "5" and "10".

The terms "component", "module", "system", "interface" and the like generally refer to: hardware, combinations of hardware and software, software or executing software. For example, a component may be, but is not limited to, a process running in a processor, a processor, an object, an executable application, an executed thread, a program and/or a computer. According to the drawings, both an application running on a controller and the controller may be components. One or more components may exist in an executed process and/or thread, and the component may be located on one computer and/or distributed between two or more computers.

The word "embodiment" used in the specification refers to an instance, an example, or an illustration. Moreover, the article "a" used in the specification and claims may generally be explained as "one or more", unless otherwise specified or clearly directed to a singular form according to the context.

The subject required to be protected in the present disclosure may be implemented by using standard programming and/or an engineering technology to produce software, firmware, hardware, or any other combination thereof, to control a computer to implement a method, an apparatus, or an article of manufacture of the disclosed subject. The term "article of manufacture" used in the specification is intended to encompass a computer program accessible from any computer-readable device, carrier, or medium. Certainly, a person skilled in the art may be aware that modifications may be performed on the configuration without departing from the scope and spirit of the subject required to be protected.

Figure 2:
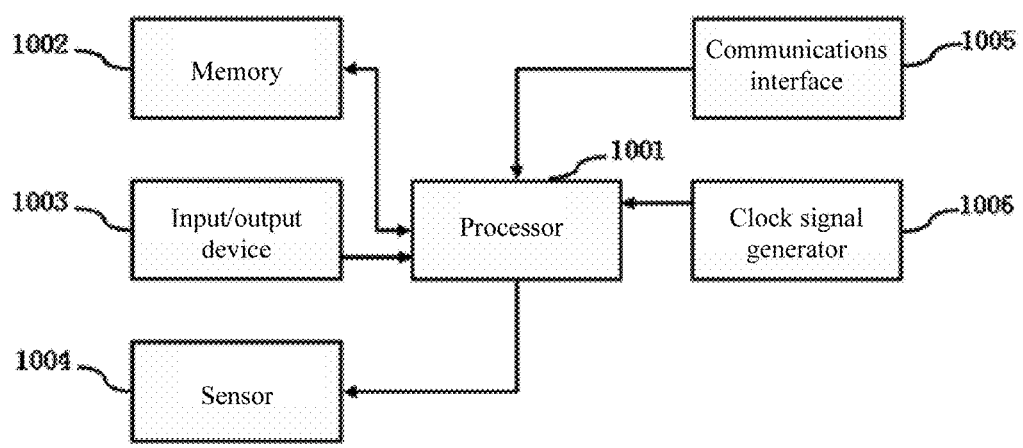
FIG. 2 is a schematic diagram of an operating environment of a character string display method and apparatus according to the present disclosure.

FIG. 1, FIG. 2 and subsequent discussions provide descriptions on a working mode and an operating environment for implementing one or more embodiments described in the specification. The operating environment shown in FIG. 1 are merely an instance of suitable working modes and operating environments, and are not intended to provide any suggestion on limits of the use or functional range of the working mode and operating environment.

A character string display method and apparatus in the present disclosure are applicable to the following devices: including, but not limited to, a personal computer, a server computer, a handheld or a laptop device, a mobile device (such as a mobile phone, a personal digital assistant (PDA), and a media player), a multi-processor system, a consumer electronic device, a minicomputer, a mainframe computer, a distributed computing environment including any of the foregoing systems or devices, and the like.

FIG. 1 shows a working environment of an apparatus or a system of one or more embodiments provided in the specification, where the character string display method and apparatus in the present disclosure are applicable to any one of a server 100 and a client device (terminal) 200. The server 100 communicates with the client device (terminal) 200 by using a network 300, and the server 100 performs interaction and data exchange with the client device (terminal) 200 by using the network 300.

Referring to FIG. 2, FIG. 2 is a schematic diagram of an operating environment of a character string display method and an apparatus according to the present disclosure.

The client device (terminal) 200 or the server 100 on which the character string display method and apparatus in the present disclosure are applied or run may be one of a desktop computer, a notebook computer, a smart phone, or a system formed by combining more than one of them. The client device (terminal) 200 or the server 100 may include any combination 100 of a processor 1001, a memory 1002, a sensor 1004, a clock signal generator 1006, a communications interface 1005, an input/output device 1003 and the like, and any combination 100 of a processor 1001 in the client device (terminal) 200, the memory 1002, the sensor 1004, the input/output device 1003, the communications interface 1005, the clock signal generator 1006 and the like, so as to implement steps in the character string display method and functions in the character string display apparatus (the terminal 200/the server 100) in the present disclosure.

In the present disclosure, for example, the modules (i.e., an acquiring module 301, an analyzing module 302, and a display module 303, determining module 401, a process value generating module 501 and a predetermined threshold generating module 502) described in relation to FIGS. 2-7 each includes computer programs that can be stored in memory 1002. The modules described in relation to FIGS. 2-7 may also include hardware components, such as a processor, a display screen, etc. When executed by the processor 1001, the computer programs performs the functions as described in relation to FIGS. 2-7, such as the functions describe in relation to steps 601-603 and 701-704.

Figure 3:
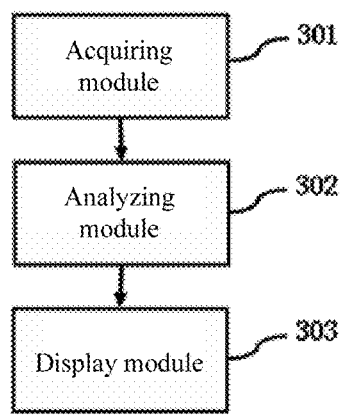
FIG. 3 is a block diagram of a character string display apparatus according to an embodiment of the present invention.

Referring to FIG. 3, FIG. 3 is a block diagram of a character string display apparatus according to an embodiment of the present invention.

The character string display apparatus in this embodiment includes an acquiring module 301, an analyzing module 302, and a display module 303.

The acquiring module 301 is configured to acquire character string data, the character string data being data corresponding to a to-be-displayed character string, and the character string including at least one character. Specifically, the acquiring module 301 may be configured to acquire the character string data from a database, and may also be configured to receive the character string data from a server.

The analyzing module 302 is configured to analyze the character string data to generate an analysis result. The analysis result includes number of digit information related to the character string (the number of characters in the character string) and digit sequence information of each character (an arrangement order of the characters in the character string).

Figure 8:
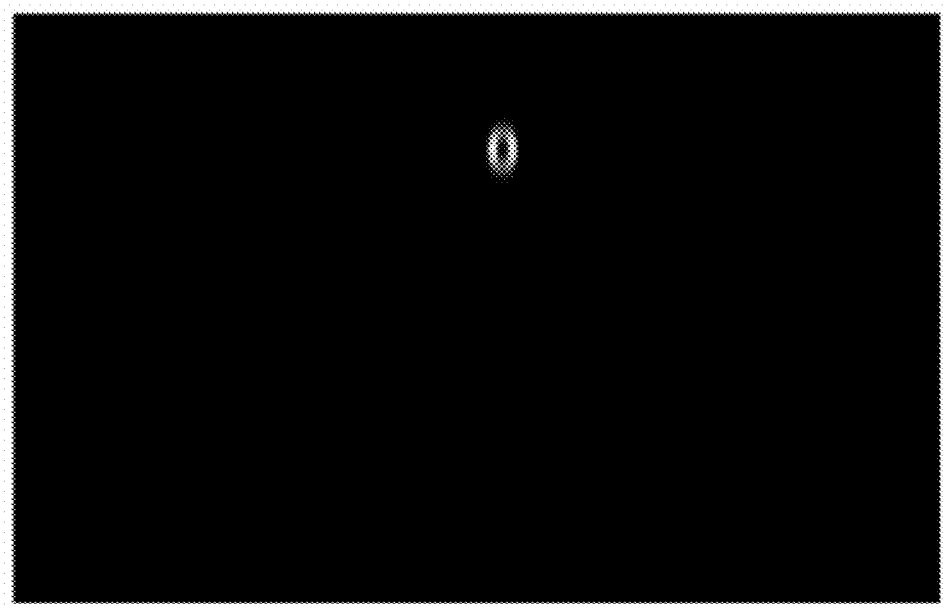
FIG. 8 to FIG. 13 are schematic diagrams of a displaying process of the character string from a start digit to an end digit.
Figure 9:
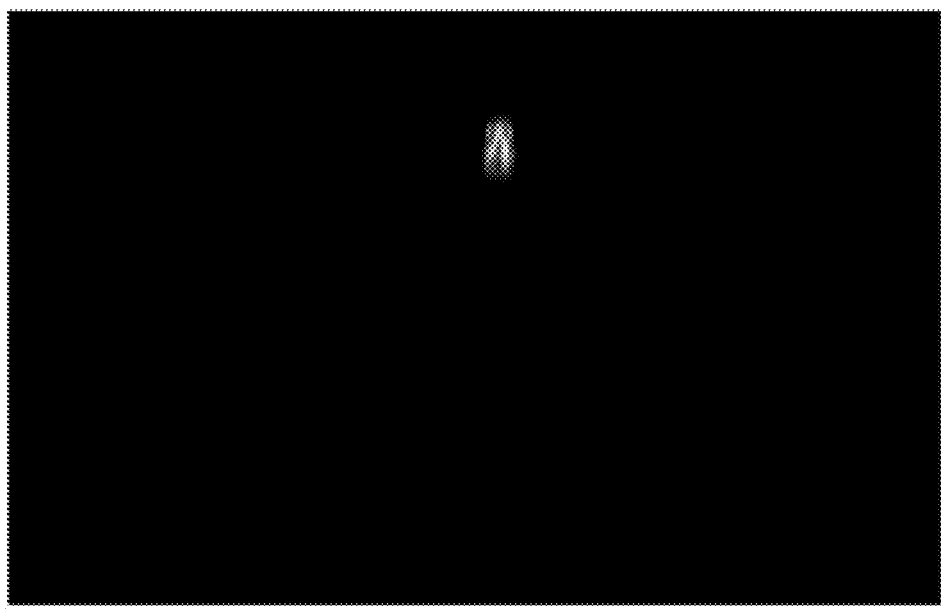

In one embodiment, the display module 303 may include a hardware component such as a display screen and related software components managing the display on the display screen. The display module 303 is configured to display, digit by digit according to the digit sequence information and the number of digit information, a picture set corresponding to each character, the picture set including at least one picture. Specifically, for one character in the character string, the display module 303 displays, one by one, each picture in a picture set corresponding to the character, and after displaying all the pictures in the picture set completely, for a character at a next digit in the character string, the display module 303 displays, one by one, each picture in a picture set corresponding to the character. As shown in FIG. 8 and FIG. 9, a picture "0" to a picture "5" in a picture set corresponding to a character "5" in the ones place are displayed first one by one; a picture "0" to a picture "7" in a picture set corresponding to a character "7" in the tens place are displayed one by one; a picture "0" to a picture "8" in a picture set corresponding to a character "8" at the hundreds place are displayed one by one; and a picture "0" to a picture "9" in a picture set corresponding to a character "9" at the thousands place are displayed one by one. The content of the picture is related to a numeral set corresponding to the character.

By means of the foregoing technical solution, the character string display apparatus in the present disclosure can dynamically display a character string, thereby overcoming the defect that using a Flash animation cannot meet the requirement of dynamic change of characters, and also overcoming the defect that upper and lower limits of numerals cannot be restricted.

Figure 4:
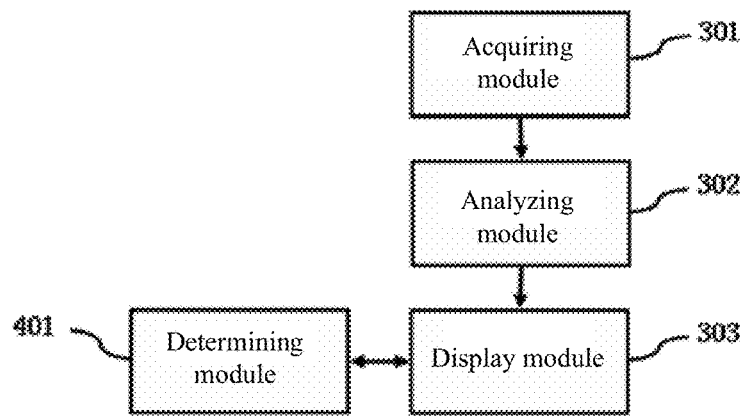
FIG. 4 is a block diagram of a character string display apparatus according to an embodiment of the present invention.

Referring to FIG. 4, FIG. 4 is a block diagram of a character string display apparatus according to an embodiment of the present invention. This embodiment is similar to the method in FIG. 1, and a difference is described as follows:

In the character string display apparatus in this embodiment, the display module 303 is configured to display, in sequence in a preset order, each picture in the picture set corresponding to the to-be-displayed character. The preset order includes: from a character at a low-place-value digit to a character at a high-place-value digit; from a character at a high-place-value digit to a character at a low-place-value digit; and from a character at any digit to a character at a high-place-value digit and a character at a low-place-value digit separately.

The apparatus further includes a determining module 401.

The determining module 401 is configured to determine, every first predetermined time, whether a display process value of the picture set corresponding to the to-be-displayed character is greater than or equal to a predetermined threshold, and generate a determining result. The determining result includes the following two cases: in the first case, the display process value of the picture set is greater than or equal to the predetermined threshold; in the second case, the display process value of the picture set is less than the predetermined threshold. The determining module 401 is further configured to send a trigger signal to the display module 303 when the determining result is the first case, where the trigger signal is used for triggering the display module 303 to display pictures in a picture set corresponding to a character at a next digit.

The display module 303 is further configured to set a character at an adjacent higher-order digit as the to-be-displayed character in a case in which the determining result is that the display process value is greater than or equal to the predetermined threshold, and repeat the foregoing operations until a picture set corresponding to a character at the highest-order digit in the character string is completely displayed, and configured to continue, in a case in which the determining result is that the display process value is greater than or equal to the predetermined threshold, to display each picture in the picture set corresponding to the to-be-displayed character in sequence.

For example, it is assumed that the predetermined threshold is 9, there are 10 pictures in the picture set that corresponds to the character and is being displayed, and the display module 303 has displayed 9 pictures among them; therefore, the display process value is 9. In this case, the display process value is greater than or equal to the predetermined threshold. The display module 303 is further configured to continue to display the $10^{th}$ picture in the picture set, and at the same time, is configured to start displaying each picture in a picture set corresponding to a character at a next digit (for example, at an adjacent higher-order digit or lower-order digit), and repeat the foregoing operations until all pictures in a picture set corresponding to the last character in the character string are displayed.

In the character string display apparatus in this embodiment, the display module 303 is further configured to keep displaying of a final picture corresponding to the displayed character before a second predetermined time is reached, in other words, from a time of displaying the first character (a character corresponding to a start digit) to a time when the preset time is reached, for the displayed character, the display module 303 is configured to keep the final picture (the last picture/a character corresponding to an end digit) in the corresponding picture set in a display state.

The first predetermined time may be preset. For example, the first predetermined time is 0.5 second, 0.1 second, or the like. The first predetermined time may further be obtained by real-time (dynamic) calculation according to the number of pictures in the picture set corresponding to the character, for example, in a case in which the picture set corresponding to the character has 5 pictures, the display module 303 is configured to set the first predetermined time to 1.5 seconds, or in a case in which the picture set corresponding to the character has 8 pictures, the display module 303 is configured to set the first predetermined time to 2.4 seconds, and so on.

Similarly, the second predetermined time may also be preset, such as 10 seconds or 30 seconds. The second predetermined time may be further set according to a time actually required for displaying the character string, for example, in a case in which the character string has 4 characters (the number of digit information is 4), the display module 303 is configured to set the second predetermined time to 16 seconds, or in a case in which the character string has 6 characters (the number of digit information is 6), the display module 303 is configured to set the second predetermined time to 24 seconds.

In the character string display apparatus in this embodiment, the display module 303 is further configured to acquire display area information according to the number of digit information, and configured to display, in a sub-area in sequence in a preset order, each picture in the picture set corresponding to the to-be-displayed character, where the display area information corresponds to a display area of the character string, the display area includes at least one sub-area, and the sub-area corresponds to a display position of the character.

Specifically, in this embodiment, the display area information includes the display position of the character string, the sub-area is used to display the picture in the picture set corresponding to the character, and the sub-area corresponds to the picture in terms of size and shape.

In the character string display apparatus in this embodiment, each picture in the picture set is displayed in a preset display mode, and the preset display mode includes at least one of a scroll mode, a gradient mode, a zoom mode, and a flash mode.

Figure 5:
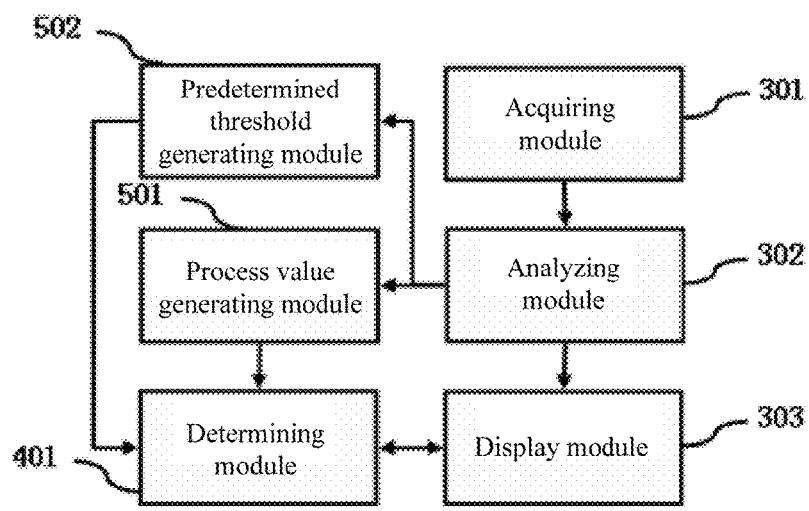
FIG. 5 is a block diagram of a character string display apparatus according to an embodiment of the present invention.

Referring to FIG. 5, FIG. 5 is a block diagram of a fourth embodiment of a character string display apparatus according to the present disclosure. This embodiment is similar to any one of the first to third embodiments as described above, and a difference is described as follows:

In the character string display apparatus in this embodiment, the analysis result further includes a character value corresponding to each character.

The predetermined threshold corresponds to the character value.

The apparatus further includes a process value generating module 501 and a predetermined threshold generating module 502.

The process value generating module 501 is configured to generate the display process value according to the number of pictures in the picture set that have been displayed. Specifically, the process value generating module 501 generates the display process value in real time according to a display state of pictures in the picture set.

The predetermined threshold generating module 502 is configured to generate the predetermined threshold according to the character value. Specifically, after the analyzing module 302 obtains through analyzing the character value, the predetermined threshold generating module acquires the character value corresponding to the to-be-displayed character, and generates the predetermined threshold according to the character value. For example, the character value is 10, and the predetermined threshold may be 9, 9.5, 8.8, or the like.

The fifth embodiment of the character string display apparatus in the present disclosure is similar to any one of the first to fourth embodiments as described above, and a difference is described as follows:

In the character string display apparatus in this embodiment, the analysis result further includes system information related to the character string.

The display module 303 is further configured to acquire the picture set according to the system information and the character value, where the number of the pictures in the picture set corresponds to the character value. For example, in a case in which the system information corresponds to a hexadecimal system, the display module 303 is configured to acquire sixteen pictures, where the sixteen pictures form the picture set.

Figure 6:
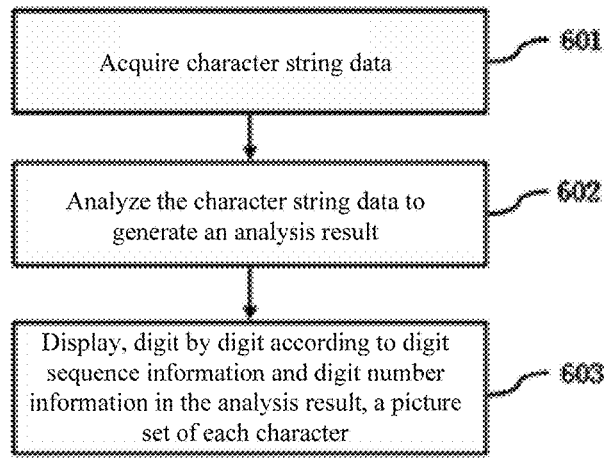
FIG. 6 is a flowchart of a character string display method according to an embodiment of the present invention.

Referring to FIG. 6, FIG. 6 is a flowchart of a character string display method according to an embodiment of the present invention.

The character string display method in this embodiment includes the following steps:

Step 601: An acquiring module 301 acquires character string data, the character string data being data corresponding to a to-be-displayed character string, and the character string including at least one character. Specifically, the acquiring module 301 may acquire the character string data from a database, and may also receive the character string data from a server or a server.

Step 602: An analyzing module 302 analyzes the character string data, so as to generate an analysis result. The analysis result includes number of digit information related to the character string (the number of characters in the character string) and digit sequence information of each character (an arrangement order of the characters in the character string).

Step 603: A display module 303 displays, digit by digit according to the digit sequence information and the number of digit information, a picture set corresponding to each character, the picture set including at least one picture. Specifically, for one character in the character string, the display module 303 displays, one by one, each picture in a picture set corresponding to the character, and after displaying all the pictures in the picture set completely, for a character at a next digit in the character string, the display module 303 displays, one by one, each picture in a picture set corresponding to the character. As shown in FIG. 8 and FIG. 9, a picture "0" to a picture "5" in a picture set corresponding to a character "5" in the ones place are displayed first one by one; a picture "0" to a picture "7" in a picture set corresponding to a character "7" in the tens place are displayed one by one; a picture "0" to a picture "8" in a picture set corresponding to a character "8" at the hundreds place are displayed one by one; and a picture "0" to a picture "9" in a picture set corresponding to a character "9" at the thousands place are displayed one by one. The content of the picture is related to a numeral set corresponding to the character.

By means of the foregoing technical solution, the character string display method in the present disclosure can dynamically display a character string, thereby overcoming the defect that using a Flash animation cannot meet the requirement of dynamic change of characters, and also overcoming the defect that upper and lower limits of numerals cannot be restricted.

Figure 7:
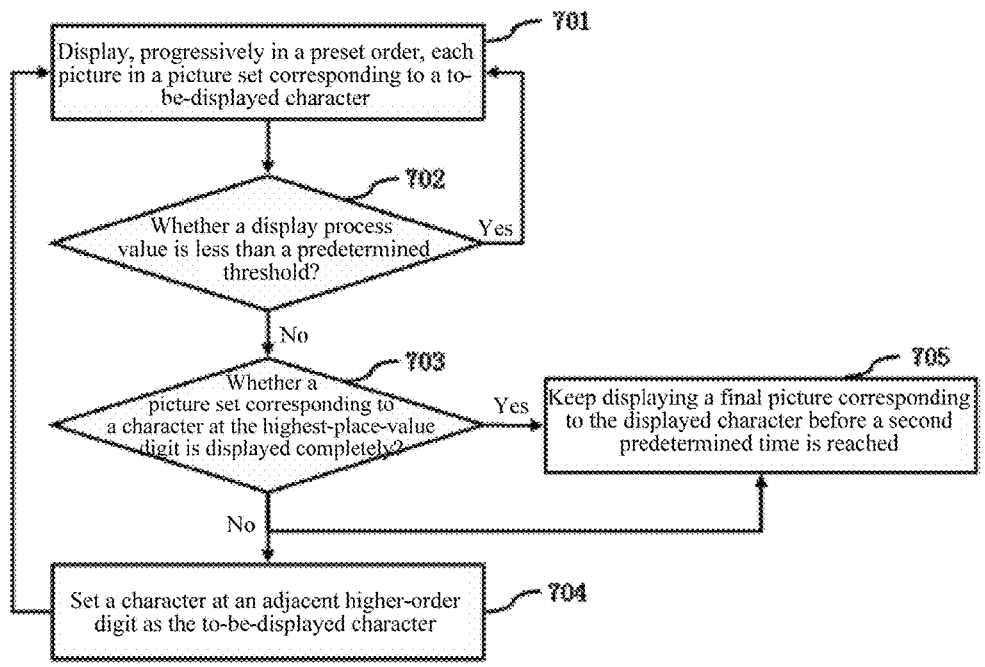
FIG. 7 is a specific working flowchart of displaying, according to the digit sequence information and the number of digit information, a picture set corresponding to each character digit by digit.

Referring to FIG. 7, FIG. 7 is a specific working flowchart of displaying, digit by digit according to the digit sequence information and the number of digit information, a picture set corresponding to each character.

In the character string display method in this embodiment, the step of displaying, digit by digit according to the digit sequence information and the number of digit information, a picture set corresponding to each character (that is, step 603) includes:

Step 701: The display module 303 displays, in sequence in a preset order, each picture in the picture set corresponding to the to-be-displayed character. The preset order includes: from a character at a low-place-value digit to a character at a high-place-value digit; from a character at a high-place-value digit to a character at a low-place-value digit; and from a character at any digit to a character at a high-place-value digit and a character at a low-place-value digit separately.

Step 702: The determining module 401 determines, every first predetermined time, whether a display process value of the picture set corresponding to the to-be-displayed character is greater than or equal to a predetermined threshold, and generates a determining result. The determining result includes the following two cases: in the first case, the display process value of the picture set is greater than or equal to the predetermined threshold; in the second case, the display process value of the picture set is less than the predetermined threshold. The determining module 401 sends a trigger signal to the display module 303 when the determining result is the first case, where the trigger signal triggers the display module 303 to display pictures in a picture set corresponding to a character at a next digit.

In the first case, the determining module 401 further determines whether the display module completely displays a picture set corresponding to the highest-order digit (an end digit), and in a case in which the picture set corresponding to the highest-order digit (the end digit) is displayed completely, step 705 is performed; otherwise, step 704 is performed.

In the second case, go back to step 701 to continue to perform step 701.

Step 704: The display module 303 sets a character at an adjacent higher-order digit as the to-be-displayed character in a case in which the determining result is that the display process value is greater than or equal to the predetermined threshold, and repeats the foregoing steps until a picture set corresponding to a character at the highest-order digit in the character string is completely displayed.

Step 705: The display module 303 continues, in a case in which the determining result is that the display process value is greater than or equal to the predetermined threshold, to display each picture in the picture set corresponding to the to-be-displayed character in sequence.

For example, it is assumed that the predetermined threshold is 9, there are 10 pictures in the picture set that corresponds to the character and is being displayed, and the display module 303 has displayed 9 pictures among them; therefore, the display process value is 9. In this case, the display process value is greater than or equal to the predetermined threshold. The display module 303 continues to display the $10^{th}$ picture in the picture set, and at the same time, starts displaying each picture in a picture set corresponding to a character at a next digit (for example, at an adjacent higher-order digit or lower-order digit), and repeats the foregoing operations until all pictures in a picture set corresponding to the last character in the character string are displayed.

In the character string display method in this embodiment, displaying of a final picture corresponding to the displayed character is kept before a second predetermined time is reached, in other words, from a time of displaying the first character (a character corresponding to a start digit) to a time when the preset time is reached, for the displayed character, the display module 303 keeps the final picture (the last picture/a character corresponding to the end digit) in the corresponding picture set in a display state.

The first predetermined time may be preset. For example, the first predetermined time is 0.5 second, 0.1 second, or the like. The first predetermined time may further be obtained by real-time (dynamic) calculation according to the number of pictures in the picture set corresponding to the character, for example, in a case in which the picture set corresponding to the character has 5 pictures, the display module 303 sets the first predetermined time to 1.5 seconds, or in a case in which the picture set corresponding to the character has 8 pictures, the display module 303 sets the first predetermined time to 2.4 seconds, and so on.

Similarly, the second predetermined time may also be preset, such as 10 seconds or 30 seconds. The second predetermined time may be further set according to a time actually required for displaying the character string, for example, in a case in which the character string has 4 characters (the number of digit information is 4), the display module 303 sets the second predetermined time to 16 seconds, or in a case in which the character string has 6 characters (the number of digit information is 6), the display module 303 sets the second predetermined time to 24 seconds.

In the character string display method in this embodiment, before the step of displaying, in sequence in a preset order, each picture in the picture set corresponding to the to-be-displayed character, the step of displaying, digit by digit according to the digit sequence information and the number of digit information, a picture set corresponding to each character further includes: acquiring, by the display module 303, display area information according to the number of digit information, where the display area information corresponds to a display area of the character string, the display area includes at least one sub-area, and the sub-area corresponds to a display area of the character.

The step of displaying, in sequence in a preset order, each picture in the picture set corresponding to the to-be-displayed character is:

displaying, by the display module 303 in the sub-area in sequence in a preset order, each picture in the picture set corresponding to the to-be-displayed character.

Specifically, in this embodiment, the display area information includes a display position of the character string, the sub-area displays the picture in the picture set corresponding to the character, and the sub-area corresponds to the picture in terms of size and shape.

In the character string display method in this embodiment, each picture in the picture set is displayed in a preset display mode, and the preset display mode includes at least one of a scroll mode, a gradient mode, a zoom mode, and a flash mode.

In the character string display method in this embodiment, the analysis result further includes a character value corresponding to each character.

The predetermined threshold corresponds to the character value.

The step of displaying, digit by digit according to the digit sequence information and the number of digit information, a picture set corresponding to each character further includes: generating, by a process value generating module 501, the display process value according to the number of pictures in the picture set that have been displayed. Specifically, the process value generating module 501 generates the display process value in real time according to a display state of pictures in the picture set.

The step of displaying, in sequence in a preset order, each picture in the picture set corresponding to the to-be-displayed character further includes: generating the predetermined threshold according to the character value. Specifically, after the analyzing module 302 obtains through analyzing the character value, the predetermined threshold generating module acquires the character value corresponding to the to-be-displayed character, and generates the predetermined threshold according to the character value. For example, the character value is 10, and the predetermined threshold may be 9, 9.5, 8.8, or the like.

The fifth embodiment of the character string display method in the present disclosure is similar to any one of the first to fourth embodiments as described above, and a difference is described as follows:

In the character string display method in this embodiment, the analysis result further includes system information related to the character string.

Before the step of displaying, digit by digit according to the digit sequence information and the number of digit information, a picture set corresponding to each character, the method further includes: acquiring, by the display module 303, the picture set according to the system information and the character value, where the number of the pictures in the picture set corresponds to the character value. For example, in a case in which the system information corresponds to a hexadecimal system, the display module 303 acquires sixteen pictures, where the sixteen pictures form the picture set.

The character string display method and apparatus in the present disclosure provide methods for adding a rolling effect to each digit of any character (for example, a numeral) and for adding triggering and restriction mechanisms between characters, so that the present disclosure has a strong adaptability, is not limited by the number of digits of the character, and can dynamically calculate upper and lower limits of each character. In summary, specific steps of the solution are as follows:

(A) Calculate the length of a character (for example, a numeral).

(B) Acquire a character (for example, a numeral) of each digit sequentially (for example, in an order from a low-place-value digit to a high-place-value digit), and determine upper and lower limits of a rolling character corresponding to the digit.

(C) In an interval directed to each rolling character, initialize the characters sequentially from a low-place-value digit to a high-place-value digit and add the character to a designated position of a display area (a screen); add a rolling animation for the characters in the rolling interval sequentially from a low-place-value digit to a high-place-value digit; and trigger an animation of a finally displayed character at this digit when animations of the characters in the rolling interval are completed.

(D) When the rolling effect of a character at a low-place-value digit is completed, trigger a rolling animation of a high-place-value digit, repeat steps (B) and (C) until the rolling effect of the whole character is completed, and trigger the animation to complete animation call-back.

Figure 13:

By using the numeral 9875 as an example, a final display effect is shown in FIG. 13.

By using serial rolling display from a low-place-value digit to a high-place-value digit as an example, the numeral finally displayed at the ones place is 5 (decimal), the rolled numerals are numerals from the minimum mineral to the finally displayed numeral, that is, the rolling numerals at the ones place is "0", "1", "2", "3" and "4", and rolling is performed from "0" to "4" sequentially; a certain period of time is delayed (determined according to a requirement, the delay time herein is selected as a rolling time) after "0" is rolled and the rolling effect of a subsequent numeral is triggered, and the animation effect of the finally displayed numeral "5" is triggered after "4", as shown in FIG. 8 and FIG. 9.

Figure 10:
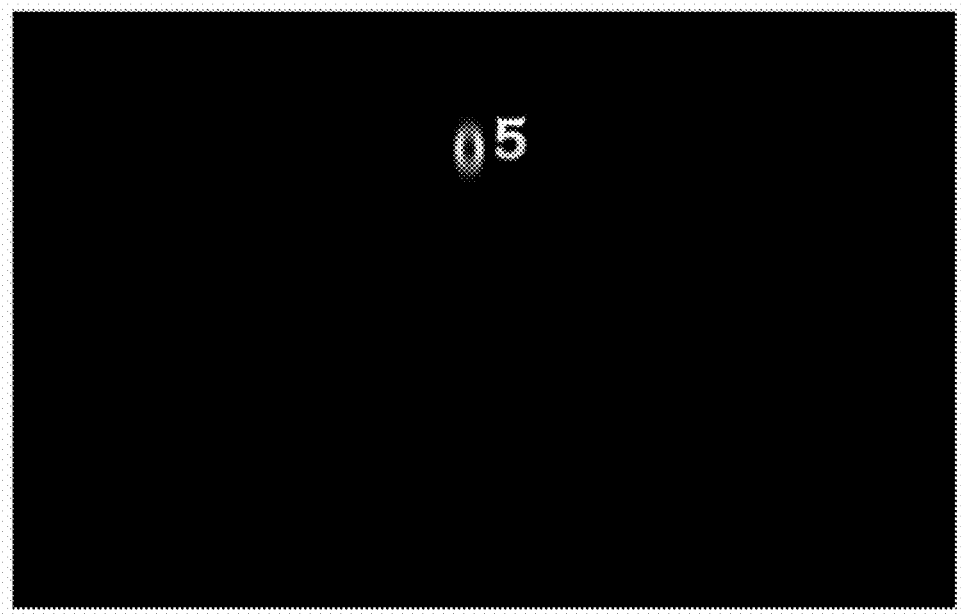
Figure 11:
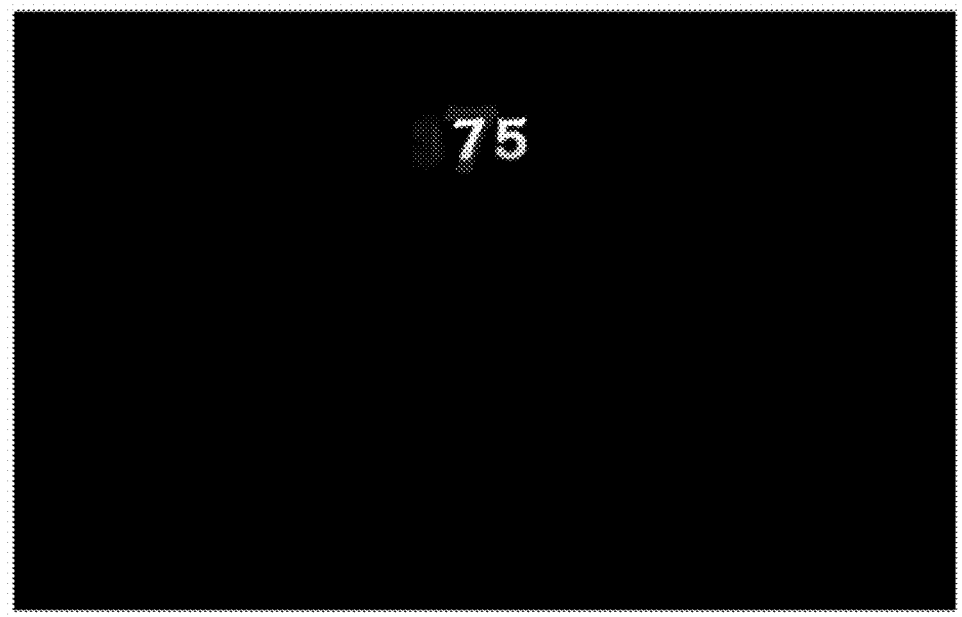
Figure 12:

The animation effect of a numeral at a high-place-value digit is triggered when the final numeral at the ones place is displayed (or before the animation effect of the finally displayed numeral at the ones place is completed, to keep the consistency of the animation effects), as shown in FIG. 10 to FIG. 12.

As shown in FIG. 8 to FIG. 13, the rolling numerals of a low-place-value digit are values between "0" to the numeral at the digit, the animation effect of a smaller numeral is completed and called back to trigger the animation effect of a subsequent numeral, the animation effect of a high-place-value digit is triggered when the animation effect of a low-place-value digit is completed, and animation effect complete call-back is triggered after the animation effects of all digits are completed; therefore, control on each digit is implemented. The entire flowchart is shown in the following figure, and it is not limited by the number of digits. Dynamic calculation can be performed according to actual situations, and dynamic calculation can also be performed on a rolling numeral range of each digit, which can be expanded to different systems.

In the present disclosure, a computer readable instruction used for implementing one or more embodiments provided in the specification may be stored in a memory 1002. The memory 1002 may further store other computer readable instructions for implementing an operating system, an application program, and the like. The computer readable instructions may be loaded in the memory 1002 and executed by a processor 1001.

A computer readable medium includes a computer storage medium. The computer storage medium includes volatile and nonvolatile, removable and non-removable mediums implemented by any method or technology and used for storing information such as computer readable instructions or other data. The memory 1002 is an instance of the computer storage medium. The computer storage medium includes, but is not limited to, a RAM, a read-only memory (ROM), an electrically erasable programmable read-only memory (EEPROM), a flash memory, or other storage technologies, a compact disc ROM (CD-ROM), a digital versatile disc (DVD) or other optical storage apparatuses, a cassette tape, a magnetic tape, a magnetic disk storage apparatus or other magnetic storage devices.

The computer readable instruction may be implemented as a program module, such as a function, an object, an application programming interface (API), a data structure, or the like that is used for executing a specific task or implementing a specific abstract data type. Typically, the functions of the computer readable instruction may be combined or distributed randomly in various environments.

Although the present disclosure is shown and described by using one or more implementation manners, a person skilled in the art may conceive equivalent variations and modifications based on reading and understanding of the specification and the accompany drawings. The present disclosure includes all such variations and modifications, which is only limited by the scope of the appended claims. In particular regard to the various functions performed by the foregoing components (such as elements and resources), terms used to describe such components are intended to correspond to any component (unless indicated otherwise) performing specified functions of the components (for example, the components are equivalent in functions), even though structures of the functions are not equivalent to the disclosed structures of functions in the exemplary implementation manners in the specification shown in the specification. In addition, although specific features of the specification are disclosed with respect to only one of several implementation manners, the features may be combined with one or more other features of other implementation manners that are desirable for and advantageous to a given or specific application. Moreover, for the terms "include", "have", "contain" or variations thereof being used in specific implementation manners or claims, the terms are intended to be inclusive in a similar manner to that of the term "comprise".

The specification provides various operations of the embodiments. The sequence of some or all operations described should not be explained as that the operations must be related to the sequence. A person skilled in the art will understand replaceable sequences having benefits of the specification. Moreover, it should be understood that, not all operations are mandatory in every embodiment provided in the specification.

To sum up, the present disclosure has been disclosed through preferred embodiments; however, the preferred embodiments are not intended to limit the present disclosure, and a person of ordinary skill in the art can make various modifications and improvements without departing from the spirit and scope of the present disclosure; therefore, the protection scope of the present disclosure should be subject to the scope defined by the claims.

What is claimed is:

1. A character string display method, implemented by a computing device having one or more processors and memory storing programs executed by the one or more processors, the method comprising:
acquiring character string data, the character string data being data corresponding to a to-be-displayed character string, and the character string comprising a plurality of characters;
analyzing the character string data to acquire number of digit information related to the character string and digit sequence information of each said character; and
displaying, digit by digit according to the digit sequence information and the number of digit information, a plurality of picture sets corresponding to said plurality of characters of said character string data, comprising:
displaying a first digit of the to-be-displayed character string; and
after finishing the displaying the first digit of the to-be-displayed character string, displaying a second digit of the to-be-displayed character string;
wherein each of said picture set comprises a plurality of pictures, and the plurality of pictures of each corresponding said picture set includes corresponding said character and at least one other character not the same as corresponding said character,
wherein displaying each of the picture set includes: displaying first the at least one said other character and displaying last corresponding said character at one character sequence at a time.

2. The method according to claim 1, wherein the displaying, digit by digit according to the digit sequence information and the number of digit information, a plurality of picture sets corresponding to said plurality of characters of said character string data, comprises:
displaying, in a preset order, each picture in the picture set corresponding to the to-be-displayed character;
determining, every first predetermined time, whether a display process value of the picture set corresponding to the to-be-displayed character is greater than or equal to a predetermined threshold, and generating a determining result;
setting a character at an adjacent higher-order digit as the to-be-displayed character in a case in which the determining result is that the display process value is greater than or equal to the predetermined threshold, and repeating the foregoing sequential display step to the determining step until a picture set corresponding to a character at the highest-order digit in the character string is completely displayed; and
continuing, in a case in which the determining result is that the display process value is less than the predetermined threshold, to display each picture in the picture set corresponding to the to-be-displayed character in the preset order.

3. The method according to claim 2, wherein displaying of a final picture corresponding to a displayed character is kept before a second predetermined time is reached.

4. The method according to claim 2, wherein before the displaying, in sequence in a preset order, each picture in the picture set corresponding to the to-be-displayed character, the step of displaying, digit by digit according to the digit sequence information and the number of digit information, a plurality of picture sets corresponding to said plurality of characters of said character string data further comprises:
acquiring display area information according to the number of digit information, wherein the display area information corresponds to a display area of the character string, the display area comprises at least one sub-area, and the sub-area corresponds to a display area of the character; and
the displaying, in sequence in a preset order, each picture in the picture set corresponding to the to-be-displayed character is:
displaying, in the sub-area sequentially in a preset order, each picture in the picture set corresponding to the to-be-displayed character.

5. The method according to claim 2, wherein each picture in the picture set is displayed in a preset display mode, and the preset display mode comprises at least one of a scroll mode, a gradient mode, a zoom mode, and a flash mode.

6. The method according to claim 2, wherein the analyzing the character string data further comprises: acquiring a character value corresponding to each said character; and the predetermined threshold corresponds to the character value;
the displaying, digit by digit according to the digit sequence information and the number of digit information, a plurality of picture sets corresponding to said plurality of characters of said character string data further comprises:
generating the display process value according to the number of pictures in the picture set that have been displayed; and
the displaying, in sequence in a preset order, each picture in the picture set corresponding to the to-be-displayed character further comprises:
generating the predetermined threshold according to the character value.

7. The method according to claim 1, wherein the analyzing the character string data further comprises: acquiring system information related to the character string; and
before the displaying, digit by digit according to the digit sequence information and the number of digit information, a plurality of picture sets corresponding to said plurality of characters of said character string data, the method further comprises:
acquiring the picture set according to the system information and a character value, wherein the number of the pictures in the picture set corresponds to the character value.

8. A character string display apparatus, comprising:
one or more processors; and
a memory coupled to the one or more processors, wherein the one or more processors are configured to:
acquire character string data, the character string data being data corresponding to a to-be-displayed character string, and the character string comprising a plurality of characters;
analyze the character string data to acquire number of digit information related to the character string and digit sequence information of each said character; and
display, digit by digit according to the digit sequence information and the number of digit information, a plurality of picture sets corresponding to said plurality of characters of said character string data, comprising:
display a first digit of the to-be-displayed character string; and
after finishing the display the first digit of the to-be-displayed character string, displaying a second digit of the to-be-displayed character string;

wherein each of said picture set comprises a plurality of pictures, and the plurality of pictures of each corresponding said picture set includes corresponding said character and at least one other character not the same as corresponding said character, wherein displaying each of the picture set includes: displaying first the at least one said other character and displaying last corresponding said character at one character sequence at a time.

9. The apparatus according to claim 8, wherein the one or more processors are configured to:

display, in sequence in a preset order, each said picture in the picture set corresponding to the to-be-displayed character;

determine, every first predetermined time, whether a display process value of the picture set corresponding to the to-be-displayed character is greater than or equal to a predetermined threshold, and generate a determining result;

set a character at an adjacent higher-order digit as the to-be-displayed character in a case in which the determining result is that the display process value is greater than or equal to the predetermined threshold, and repeat the sequential display step to the determining step until a picture set corresponding to a character at the highest-order digit in the character string is completely displayed; and continue, in a case in which the determining result is that the display process value is less than the predetermined threshold, to display each picture in the picture set corresponding to the to-be-displayed character sequentially.

10. The apparatus according to claim 9, wherein the one or more processors are further configured to keep displaying of a final picture corresponding to a displayed character before a second predetermined time is reached.

11. The apparatus according to claim 9, wherein the one or more processors are further configured to acquire display area information according to the number of digit information, and configured to display, in a sub-area sequentially in a preset order, each said picture in the picture set corresponding to the to-be-displayed character, wherein the display area information corresponds to a display area of the character string, the display area comprises at least one sub-area, and the sub-area corresponds to a display area of the character.

12. The apparatus according to claim 9, wherein each picture in the picture set is displayed in a preset display mode, and the preset display mode comprises at least one of a scroll mode, a gradient mode, a zoom mode, and a flash mode.

13. The apparatus according to claim 9, wherein the analyzing the character string data further comprises: acquiring a character value corresponding to each said character, wherein the predetermined threshold corresponds to the character value; and the one or more processors are further configured to:

generate the display process value according to the number of pictures in the picture set that have been displayed; and generate the predetermined threshold according to the character value.

14. The apparatus according to claim 8, wherein the analyzing the character string data further comprises: acquiring system information related to the character string; and the one or more processors are further configured to acquire the picture set according to the system information and a character value, wherein the number of the pictures in the picture set corresponds to the character value.

15. A non-transitory computer readable storage medium having stored therein one or more instructions, which, when executed by a computing device, cause the computing device to:

acquire character string data, the character string data being data corresponding to a to-be-displayed character string, and the character string comprising a plurality of characters;

analyze the character string data to acquire number of digit information related to the character string and digit sequence information of each said character; and display, digit by digit according to the digit sequence information and the number of digit information, a plurality of picture sets corresponding to said plurality of characters of said character string data, comprising:

display a first digit of the to-be-displayed character string; and after finishing the display the first digit of the to-be-displayed character string, displaying a second digit of the to-be-displayed character string;

wherein each of said picture set comprises a plurality of pictures, and the plurality of pictures of each corresponding said picture set includes corresponding said character and at least one other character not the same as corresponding said character, wherein displaying each of the picture set includes: displaying first the at least one said other character and displaying last corresponding said character at one character sequence at a time.

16. The method according to claim 1, wherein the character string is a numerical string having a plurality of numerical digits.

17. The method according to claim 16, wherein the plurality of picture sets comprise a plurality of numerical picture sets corresponding to the plurality of numerical digits; and each numerical digit of the plurality of numerical digits corresponds to one numerical picture set, and the one numerical picture set comprises one picture of the numerical digit and at least one other picture of number less than the numerical digit.

* * * * *